(No Model.)

W. M. WILLIAMS.
AUTOMATIC VALVE FOR SERVICE PIPES.

No. 570,833.  Patented Nov. 3, 1896.

Witnesses
Harry L. Ames.

Inventor
William M. Williams.
By his Attorneys,
C. A. Snow & Co.

UNITED STATES PATENT OFFICE.

WILLIAM M. WILLIAMS, OF OPELIKA, ALABAMA, ASSIGNOR TO GEORGE E. DRIVER, OF SAME PLACE.

AUTOMATIC VALVE FOR SERVICE-PIPES.

SPECIFICATION forming part of Letters Patent No. 570,833, dated November 3, 1896.

Application filed November 21, 1895. Serial No. 569,670. (No model.)

*To all whom it may concern:*

Be it known that I, WILLIAM M. WILLIAMS, a citizen of the United States, residing at Opelika, in the county of Lee and State of Alabama, have invented a new and useful Automatic Valve for Service-Pipes, of which the following is a specification.

My invention relates to a drain for water-service pipes, and has for its object to provide a common automatically-operating drain for both hot and cold water pipes in order to avoid the use of a plurality of drains for said hot and cold water pipes, respectively, whereby when the pressure in the cold-water service-pipe is reduced or relieved by the opening of the drain-valve employed in connection therewith said reduction of pressure will cause an automatic opening of a check-valve controlling the drain-outlet of the hot-water service-pipe to cause the draining of both sets of pipes simultaneously through a common outlet.

Further objects and advantages of this invention will appear in the following description, and the novel features thereof will be particularly pointed out in the appended claims.

Figure 1:
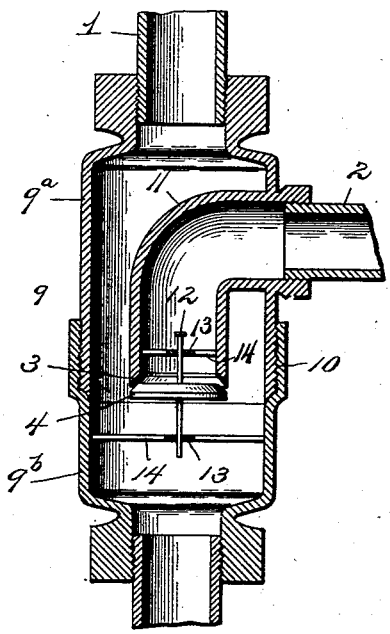
Figure 2:
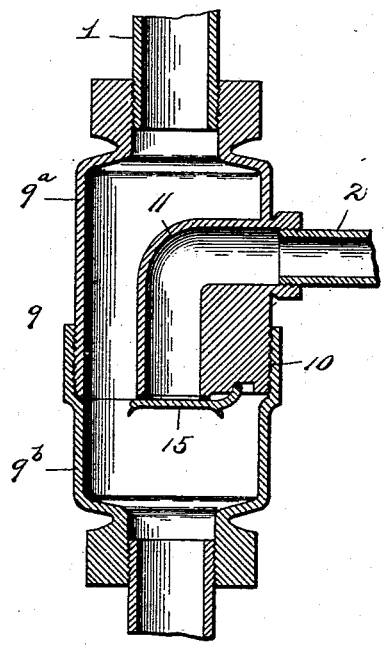
Figure 3:
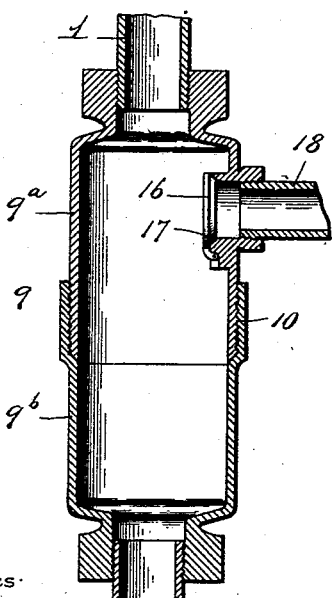
Figure 4:
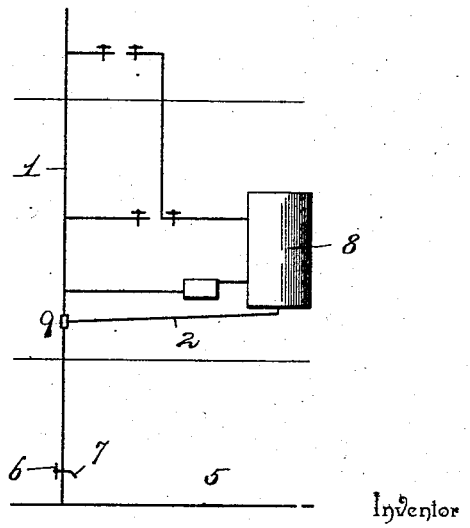

In the drawings, Figure 1 is a central section of a drain constructed in accordance with my invention. Fig. 2 is a similar view showing a slightly-modified construction of valve. Fig. 3 is a similar view of still another modified form of the invention, in which the elbow forming a part of the hot-water drain-pipe as illustrated in Figs. 1 and 2 is omitted. Fig. 4 is a diagram of a house-service water system including hot and cold water pipes.

Similar numerals of reference indicate corresponding parts in all the figures of the drawings.

1 represents the service-pipe, preferably for cold water, and piercing and communicating with the interior of said service-pipe is a drain-pipe 2, preferably for hot water or in communication with hot-water service-pipes. The orifice of the drain-pipe or nozzle 2 is provided with a seat 3 for a check-valve 4, said check-valve being exposed to service-pipe pressure, whereby when the service-pipe is in communication with the water-supply main said valve is held seated to prevent water from passing into the drain-pipe 2, and when the service-pipe is cut off from communication with the water-supply main in order to drain said service-pipe and the pressure within the service-pipe is thereby reduced said check-valve is allowed to open to drain the hot-water pipes and boiler into the cold-water or service pipe.

In the diagram shown in Fig. 4 the main or cold-water service-pipe 1 communicates with the water-supply main 5 and is provided, as at 6, with a suitable stop-cock constructed in the usual manner, whereby when the stop-cock is closed a drain-nozzle 7 is opened to allow water in the service-pipe to escape. The hot-water drain-pipe is in communication, as in the ordinary practice, with a boiler 8, adapted to be exposed to any suitable heating device.

In the construction illustrated in Fig. 1 a sectional casing 9, having the connected sections $9^a$ and $9^b$, is employed for forming the connection between the drain and service pipes, said casing having the outer extremities of its members secured, respectively, to contiguous portions of the service-pipe and having their inner or contiguous extremities connected, as by a threaded joint 10. The drain-pipe is provided with a nozzle 11, preferably of the angular or elbow shape illustrated, and formed integral with one section of the casing 9, with its extremity turned vertically downward, whereby its axis is coincidental with that of the casing. The valve 4, which is used in connection with the seat 3, formed in the outlet end of the nozzle, is provided with a stem 12, fitting to slide in suitable guides 13, supported by rods 14.

In Fig. 2 I have shown a slightly-modified construction of the device, in which a clack or flap valve 15, instead of that shown in Fig. 1, is illustrated, the casing and elbow-shaped nozzle being the same as that hereinbefore described. In Fig. 3 I have shown still another modified form of the invention, in which, instead of the elbow-nozzle arranged within the casing with a depending extremity, whereby the valve drops vertically by gravity from its seat, I employ a check-valve 16, adapted to fit a seat 17, formed in the side of the casing in communication with the contiguous portion of the drain-pipe 18, said seat being arranged approximately in a vertical plane. This construction and arrangement of parts is designed to avoid the use of an elbow in the service-pipe, but in practice I have found said elbow to be unobjectionable, and therefore I preferably employ the arrangement of parts described in connection with Figs. 1 and 2, the specific form of the valve being immaterial.

It will be seen that in all of the forms of my invention illustrated in the drawings the check-valve which controls the outlet of the drain-pipe is permanently exposed to service-pipe pressure, and that when said pressure is reduced the valve is unseated either by its weight or by the weight of the contents of the drain-pipe to cause the discharge of said contents into the service-pipe, and from thence through the usual relief-outlet with which service-pipes are ordinarily provided.

The service-pipe exceeds the drain-pipes in cross-sectional area, and the outer surface of the valve, which is exposed to service-pipe pressure, exceeds the inner surface of the valve, which is exposed to drain-pipe pressure, and hence with equal pressure to the square inch in both pipes the valve will be held closed.

Various changes in the form, proportion, and the minor details of construction may be resorted to without departing from the spirit or sacrificing any of the advantages of this invention.

Having described my invention, what I claim is—

1. The combination with a service-pipe provided with a controlling-cock and drain-outlet, of a drain-pipe communicating with the service-pipe above said controlling-cock, and a check-valve for normally closing the drain-pipe, exposed at opposite sides respectively to service and drain pipe pressure, substantially as specified.

2. The combination with communicating drain and service pipes, the former terminating within the latter and the latter having a controlling-cock and drain-outlet, of a check-valve seated in the end of the drain-pipe to cut off communication between said pipes, the check-valve having an exterior surface exposed to service-pipe pressure exceeding in area its interior surface which is exposed to drain-pipe pressure, to normally hold the valve seated, substantially as specified.

3. The combination of a casing in communication with a service-pipe having a controlling-cock and drain-outlet, a nozzle in communication with a drain-pipe and having a downturned extremity arranged within and communicating with the interior of the casing above the controlling-cock, and a check-valve having a seat at the extremity of the said nozzle and exposed permanently at opposite sides to service-pipe and drain-pipe pressure, the former normally exceeding the latter to hold the valve seated and cut off communication between the nozzle and the casing, substantially as specified.

4. The combination of a casing in communication with a service-pipe having a controlling-cock and drain-outlet and constructed of detachable sections, a nozzle piercing the casing and carried by one of said sections and connected to a drain-pipe, said nozzle being provided within the casing with a terminal valve-seat, and a check-valve exposed at opposite sides to service-pipe and drain-pipe pressure, and having a surface of greater area exposed to the service-pipe pressure, whereby it is normally held seated by service-pipe pressure and is adapted to be unseated by drain-pipe pressure upon the reduction of pressure in the service-pipe, to allow the drain-pipe to discharge into the service-pipe and from thence through the drain-outlet, substantially as specified.

In testimony that I claim the foregoing as my own I have hereto affixed my signature in the presence of two witnesses.

WILLIAM M. WILLIAMS.

Witnesses:
JOHN H. SIGGERS,
G. C. SHOEMAKER.